PRINCIPLE OF LOAD CELL

FIG. I.

ent Office 3,404,263
Patented Oct. 1, 1968

3,404,263
FLUID FLOW SIMULATION APPARATUS
Raymond Wilson Williams, Hitchen, England, assignor to British Aircraft Corporation (Operating) Limited, London, England, a British company
Filed Mar. 25, 1964, Ser. No. 354,704
Claims priority, application Great Britain, Mar. 28, 1963, 12,372/63
6 Claims. (Cl. 235—184)

ABSTRACT OF THE DISCLOSURE

To achieve a constant current flow, independent of changes of input voltages (as required in fluid network distribution analysers), the circuit input voltage is combined with a fixed opposing voltage at the input of the unity gain amplifier without phase reversal. A resistance connected between the output of the unit gain amplifier and the circuit input terminal then passes a current dependent only on the fixed opposing voltage and the value of the said resistance.

Two-terminal electrical devices are frequently required to draw a constant current independent of the input voltage. Such a requirement is met, for example, in an electrical network simulating a water or gas distribution system by direct electrical analogue. Such a system provides a convenient alternative to the use of a digital computer or of general purpose analogue computing equipment. Water or gas consumption at a draw-off point is characterized by a constant flow rate, unaffected by variation in the head at the draw-off point. An electrical device simulating consumption must therefore draw a constant current, independent of the potential applied across its terminals. The level of current can be preset to a specified value.

According to the invention, an input voltage signal is applied through an opposing voltage source to a unity gain amplifier of high impedance having no phase reversal, and the output of the amplifier is connected through a resistance to the input of the circuit. With such an arrangement, the voltage at the input of the unity gain amplifier is the algebraic sum of the input voltage signal and the opposing E.M.F. of the voltage source and this is also the voltage at the output of the amplifier. The current flowing through the resistor between the amplifier output and the circuit input is therefore equal to the value of the E.M.F. of the voltage source divided by the value of the resistor. This current is therefore independent of the input voltage.

Figure 1:
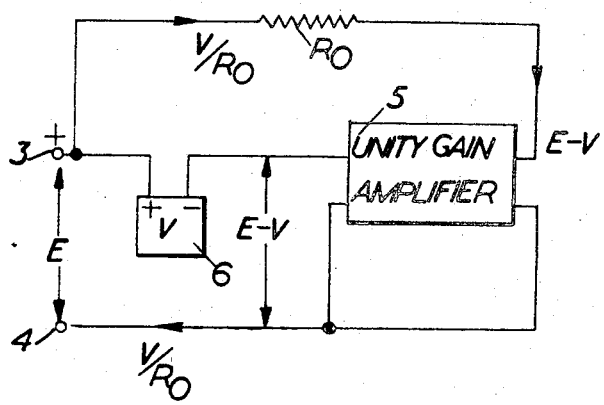
Figure 2:
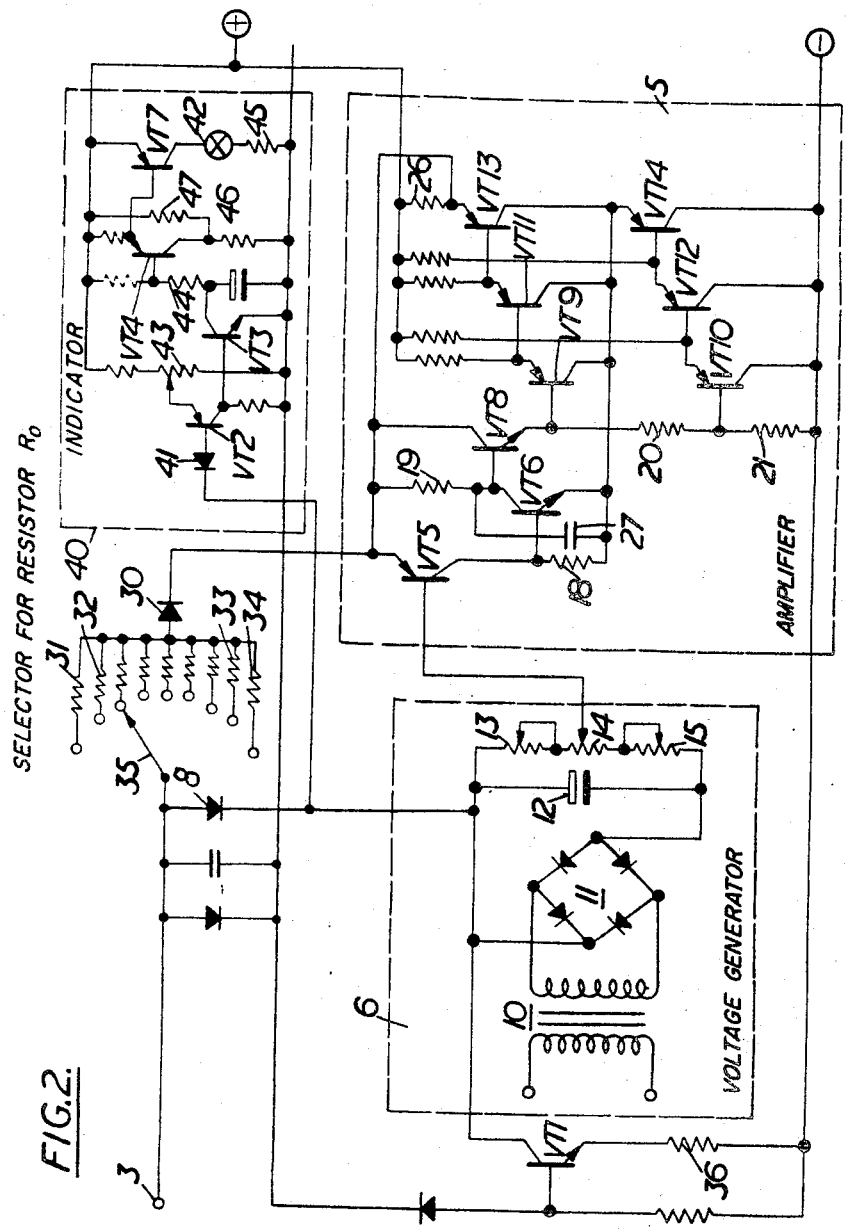

In order that the invention may be better understood an example will now be described with reference to the accompanying drawings, in which:

FIGURE 1 shows in the form of a block diagram a circuit illustrating the principle of the device; and FIGURE 2 is a complete circuit diagram of the device.

The circuit to be described was developed for a direct-analogue water network distribution analyser. Such an analyser includes in addition to the load simulating unit to be described, pipe simulating units and sources. There is a 1:1 correspondence between the pipe, load and source units in the analogue and the pipes, loads and sources of the real network. Electric current represents the rate of flow of water, and electric potential represents the pressure, or head, of water. The pipe simulating units take the form of networks simulating the head loss in a pipe through which water is flowing and the sources are stabilized power units with continuously adjustable output voltage level. When it is desired to simulate the draw-off of water at a particular point in the network, the input terminal of a load simulating unit is connected to the junction point of the relevant pipe simulating units in the analogue, and its output terminal is connected to the common earth return line of the analogue equipment. The load simulating unit then draws off current at a preset value from the junction point, independent of the potential of this point. The current drawn off returns to the source units in the analogue along the common earth return line.

Referring now to FIGURE 1, the input voltage is applied across the terminals 3 and 4 in the polarity shown, and the terminal 3 is connected to the input of the unity-gain amplifier 5 through a voltage generator 6 which generates a voltage V in opposition to the input voltage E. The voltage applied across the input of the amplifier 5 is therefore $(E-V)$ and this is also the voltage at the output of the amplifier. The output terminal of the amplifier is connected back to the terminal 3 through a resistor $R_0$. It will be seen that the voltage applied across the resistor $R_0$ is equal to $V/R_0$ and that this is independent of the input voltage E. The amplifier 5 preferably has a very low output impedance.

In FIGURE 2, the input voltage E is applied to the terminal 3 which is connected through a rectifier 8 to the voltage generator 6 which generates the voltage V. The voltage generator 6 includes a transformer 10 to the input of which there is applied an alternating voltage which may be derived from a variable voltage source. The secondary voltage of this transformer is rectified in a full wave rectifier 11, the output of which is smoothed by the capacitor 12 and this is applied across a potential divider system including the resistors 13, 14 and 15. The resistors 13 and 15 are made variable for presetting purposes and the resistor 14 is a potentiometer having a wiper which applies a fraction of the input voltage of the potential divider to the amplifier input. In the circuit shown, the transformer 10 is floating in potential.

The wiper of the potentiometer 14 is connected to the base of a transistor VT5, which constitutes the input circuit of the unit gain amplifier 5. The transistor VT5 has a collector load 18, its collector being connected to the base of a transistor VT6 having a collector load 19 and having its collector connected to the base of a transistor VT8. The transistor VT8 is an N-P-N transistor in an emitter follower circuit, the emitter load consisting of the two equal resistors 20 and 21. The base of a transistor VT9 is connected to the emitter of transistor VT8 and the base of a transistor VT10 is connected to the junction of the emitter load resistors 20 and 21.

The transistors VT9 and VT10 are P-N-P transistors connected as emitter followers and their emitters are connected to the bases of transistors VT11 and VT12. The latter transistors which are also P-N-P transistors, constitute the driving stages for the power transistors VT13 and VT14 which are connected in series with each other and with a resistor 26 between the positive and negative supply lines. The collectors of VT9 and VT11 are connected to the junction of the power transistors VT13 and VT14. Since the resistors 20 and 21 are of equal value and the base currents of VT9 and VT10 are negligibly small, the output voltage is at all times shared substantially equally across the two chains of transistors which terminate the unity gain amplifier. From the emitter of transistor VT13, a feedback connection is made to the emitter of the input transistor VT5. This is possible because the two input transistors VT5 and VT6 each give a sign reversal. This feedback connection ensures unity gain in the amplifier and reduces D.C. shift to a minimum. It also increases the input impedance and reduces the output impedance of the amplifier 5.

The capacitor 27 reduces the gain of the amplifier with increasing frequency in order to prevent high frequency oscillation.

The feedback line is also connected through a rectifier 30 to a bank of resistors 31, 32, 33, 34, which are connected to the terminals of a rotary switch, the selector arm 35 of which is preset to connect one of these resistors into circuit. The arm 35 is connected back to the input terminal 3.

A transistor VT1 having an emitter-follower resistor 36 is connected between the positive side of the full wave rectifier 11 and the negative supply line. This transistor is arranged to give a constant current through the diode 8 whatever the voltage applied to the input of the cell. The voltage drop across the diode 8 is then approximately equal to the base/emitter voltage of transistor VT5. As a result, the amplifier causes very little D.C. shift from the input to the output of the circuit.

The selected one of the resistors 31 to 34 corresponds to the resistor $R_0$ of FIGURE 1. The potential at the junction of resistors 13 and 14 and that at the junction of resistors 14 and 15 may be adjusted to values of $-V/2$ and $-V$ volts respectively, with respect to the positive end of the smoothing capacitor 12. In the preferred form of the invention, the switched resistors 31 to 34 are arranged almost in a binary progression. Thus it can be seen that the current through the cell ($V/R_0$) may be continuously varied using the switched resistors 31 to 34 as a coarse control and using the potentiometer 14 as a fine control.

As stated above, the transformer input voltage may be derived from a variable A.C. voltage source. This provides an alternative way of controlling the current drawn by the load cell and moreover facilitates remote control of the load cell current. It has a further advantage in that it enables a number of load cells to be adjusted simultaneously. In a water network distribution analyser, it is often necessary to change the value of each load in a group of loads by a specified percentage of its original value (the same percentage for each). This requirement would arise, for example, if the effects of the growth of an industrial area were being studied. To save the labour of re-adjusting separately the controls of each cell in the group in turn, the transformer primary excitation of these cells may be provided from a continuously adjustable auto-transformer. A change in the setting of the latter of, for example, 50%, will change the level of each voltage generator in the cells by 50% of its original value and consequently each load cell current (being proportional to this voltage) will change by 50%.

An indicator circuit 40 provides an indication when the input to the circuit falls below a given value. The input for the indicator circuit is taken from the collector of transistor VT1 and is applied through a rectifier 41 to the base of a transistor VT2, the collector of which is connected to the base of a transistor VT3. The collector circuit of the latter transistor includes a potential divider, an intermediate point of which is connected to the base of transistor VT4, which has an emitter follower connection to transistor VT7. The latter transistor includes in its collector circuit an indicator lamp 42.

Adjustment of the potentiometer 43 determines the level of input potential which will cause transistor VT2 to conduct. When the input voltage is high, the diode 41 is an open circuit to protect the base-emitter junction of transistor VT2. With a sufficiently low input potential transistor VT2 conducts and also causes transistor VT3 to conduct. The latter transistor drives transistor VT4, the value of the resistor 44 being high enough to prevent excessive voltage across the emitter-collector junction of transistor VT3 when the circuit is conducting. When transistor VT4 conducts, the transistor VT7 conducts heavily applying the positive input voltage across the series combination of a resistor 45 and the indicator lamp.

Resistors 46 and 47 act as a potential divider to prevent excessive voltage across the emitter-collector junction of transistor VT4 when this transistor is in a non-conducting state.

The constant-current cell described can be used as a load cell for a gas network distribution analyser. In the case of a gas analogue, as the flow is compressible the voltage is proportional to the square of the pressure (instead of being proportional to the pressure itself, as is the case for a water network analogue).

I claim:

1. An electrical circuit for achieving a constant current flow independent of changes in input voltage including a unity gain amplifier of high input impedance and having no phase reversal; a fixed voltage source connected so as to oppose the circuit input voltage, whereby the unity gain amplifier receives the difference of the input and opposing voltages; and an electrical resistance connected between the output of the unity gain amplifier and the input of the circuit.

2. A circuit according to claim 1, including a bank of resistors and a selector switch for selecting one of said resistors to form the said electrical resistance, said selector switch permitting adjustment of the current flowing through the circuit.

3. A circuit according to claim 1 including means for adjusting the output of the voltage source in a continuous manner to provide variation of a current through the cell.

4. A circuit according to claim 2, in which the resistor selector switch is used as a coarse control by adjusting the current through the cell and in which the circuit further comprises means for varying the output voltage of the voltage source, the said means constituting a fine control of the current.

5. A fluid network distribution analyser including load-simulating units, source units and pipe simulating units connected between the load simulating units and the source units, each load simulating unit comprising an electrical circuit for achieving a constant current flow independent of changes in input voltage including a unity gain amplifier of high input impedance and having no phase reversal; a fixed voltage source connected so as to oppose the circuit input voltage, whereby the unity gain amplifier receives the difference of the input and opposing voltages; and an electrical resistance connected between the output of the unity gain amplifier and the input of the circuit, said circuit drawing from the network a current independent of the potential at the point in the network to which the load simulating unit is connected.

6. A fluid network distribution analyser according to claim 5, including voltage-adjusting means common to a number of load simulating units by means of which the outputs of the said voltage sources in the said units can be simultaneously adjusted to effect a corresponding change in the current drawn by each unit.

References Cited

UNITED STATES PATENTS

| | | | |
|---|---|---|---|
| 2,616,987 | 11/1952 | Salmel | 330—93 X |
| 2,869,068 | 1/1959 | Morcerf et al. | 330—91 X |
| 2,991,936 | 7/1961 | Baldwin et al. | 235—184 |
| 3,106,684 | 10/1963 | Luik | 330—26 X |
| 3,107,331 | 10/1963 | Barditch et al. | 330—26 X |
| 3,146,346 | 8/1964 | Evangelisti et al. | 235—184 |
| 3,207,889 | 9/1965 | Evangelisti et al. | 235—184 |
| 3,265,979 | 8/1966 | Staunton | 330—75 X |

MALCOLM A. MORRISON, *Primary Examiner.*

J. F. RUGGIERO, *Assistant Examiner.*